United States Patent
Advani et al.

(10) Patent No.: US 12,284,174 B2
(45) Date of Patent: Apr. 22, 2025

(54) ONE-OF-A-KIND TO OPEN EDITION NON-FUNGIBLE TOKEN DYNAMICS

(71) Applicant: Snap Inc., Santa Monica, CA (US)

(72) Inventors: Rajeev Advani, Brooklyn, NY (US); Sophia Dominguez, New York, NY (US); Vu Tran, Bellevue, WA (US)

(73) Assignee: SNAP INC., Santa Monica, CA (US)

( * ) Notice: Subject to any disclaimer, the term of this patent is extended or adjusted under 35 U.S.C. 154(b) by 593 days.

(21) Appl. No.: 17/449,564

(22) Filed: Sep. 30, 2021

(65) Prior Publication Data

US 2023/0102606 A1    Mar. 30, 2023

(51) Int. Cl.
| | |
|---|---|
| *H04L 9/32* | (2006.01) |
| *G06F 16/27* | (2019.01) |
| *H04L 9/40* | (2022.01) |
| *G06F 3/0482* | (2013.01) |
| *G06F 21/44* | (2013.01) |

(Continued)

(52) U.S. Cl.
CPC .......... *H04L 63/0853* (2013.01); *G06F 16/27* (2019.01); *H04L 63/102* (2013.01); *G06F 3/0482* (2013.01); *G06Q 20/1235* (2013.01); *G06Q 20/389* (2013.01)

(58) Field of Classification Search
CPC ... H04L 63/0853; H04L 63/102; H04L 63/00; H04L 2209/56; H04L 9/50; G06F 16/27; G06F 3/0482; G06Q 20/1235; G06Q 20/389

See application file for complete search history.

(56) References Cited

U.S. PATENT DOCUMENTS

| | | | |
|---|---|---|---|
| 2011/0153198 A1* | 6/2011 | Kokkas | G01C 21/3647 |
| | | | 701/533 |
| 2020/0005284 A1 | 1/2020 | Vijayan | |

(Continued)

FOREIGN PATENT DOCUMENTS

| | | | | |
|---|---|---|---|---|
| WO | 2023055646 | | 4/2023 | |
| WO | WO-2023056249 A1 * | 4/2023 | | G06Q 20/02 |

OTHER PUBLICATIONS

Chris Elsden,Evan Morgan,Ella Tallyn,Suzanne R. Black,Martin Disley,Burkhard Schafer, Dave Murray-Rust, Chris Speed; "A Token Gesture: Non-Transferable NFTs, Digital Possessions and Ownership Design"; Proceedings of the ACM on Human-Computer Interaction; vol. 8, Article No. 25; Apr. 2024; pp. 1-29 (Year: 2024).*

(Continued)

*Primary Examiner* — Fatoumata Traore
*Assistant Examiner* — Courtney D Fields
(74) *Attorney, Agent, or Firm* — SCHWEGMAN LUNDBERG & WOESSNER, P.A.

(57) ABSTRACT

A system to perform operations that include: minting a Non-Fungible Token (NFT) that comprises a media object and mutable metadata; allocating the NFT to a user of a client device; granting the user of the client device a permission to change the mutable metadata of the NFT based on the allocating the NFT to the user of the client device; generating an open-edition of the NFT, the open-edition of the NFT comprising a reference to the mutable metadata; receiving a change to the mutable metadata from the user of the client device; and updating the open-edition of the NFT based on the change.

20 Claims, 13 Drawing Sheets

(51) Int. Cl.
    *G06F 21/64* (2013.01)
    *G06Q 20/12* (2012.01)
    *G06Q 20/38* (2012.01)

(56) References Cited

U.S. PATENT DOCUMENTS

2021/0067342 A1* 3/2021 Guinard ................ H04L 9/0866
2021/0248214 A1* 8/2021 Goldston ................ G06F 21/16
2022/0327225 A1* 10/2022 Lyren ..................... H04S 1/007

OTHER PUBLICATIONS

"International Application Serial No. PCT/US2022/044399, International Search Report mailed Dec. 14, 2022", 3 pgs.
"International Application Serial No. PCT/US2022/044399, Written Opinion mailed Dec. 14, 2022", 4 pgs.
"International Application Serial No. PCT/US2022/044399, International Preliminary Report on Patentability mailed Apr. 11, 2024", 6 pgs.

\* cited by examiner

ONE-OF-A-KIND TO OPEN EDITION NON-FUNGIBLE TOKEN DYNAMICS

BACKGROUND

A non-fungible token (NFT) is a unit of data stored on a digital ledger, called a blockchain, that certifies a digital asset to be unique and therefore not interchangeable. NFTs can be used to represent items such as photos, videos, audio, and other types of digital files. Access to any copy of the original file, however, is not restricted to the buyer of the NFT. While copies of these digital items are available for anyone to obtain, NFTs are tracked on blockchains to provide the owner with a proof of ownership that is separate from copyright.

NFTs function like cryptographic tokens, but, unlike cryptocurrencies like Bitcoin, NFTs are not mutually interchangeable, so not fungible. While all bitcoins are equal, each NFT may represent a different underlying asset and thus have a different value. NFTs are created when blockchains string records of cryptographic hash, a set of characters identifying a set of data, onto previous records therefore creating a chain of identifiable data blocks. This cryptographic transaction process ensures the authentication of each digital file by providing a digital signature that is used to track NFT ownership.

The creation of NFT is accomplished through a process of "minting," wherein a media object, or more specifically, a pointer to a media object, is stored on a blockchain as a public ledger. The process of minting NFT therefore enables better tracking of ownership and flexibility in resale. Typically, NFT involving digital art do not actually store the file on the blockchain due to its size. Thus, the corresponding token functions in a way similar to a certificate of ownership, with an address that points to the piece of art in question. As a result, NFT may be subject to a phenomenon known as "link rot," wherein a resource may be relocated to a new address, causing the address of an NFT to become a "dangling pointer."

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
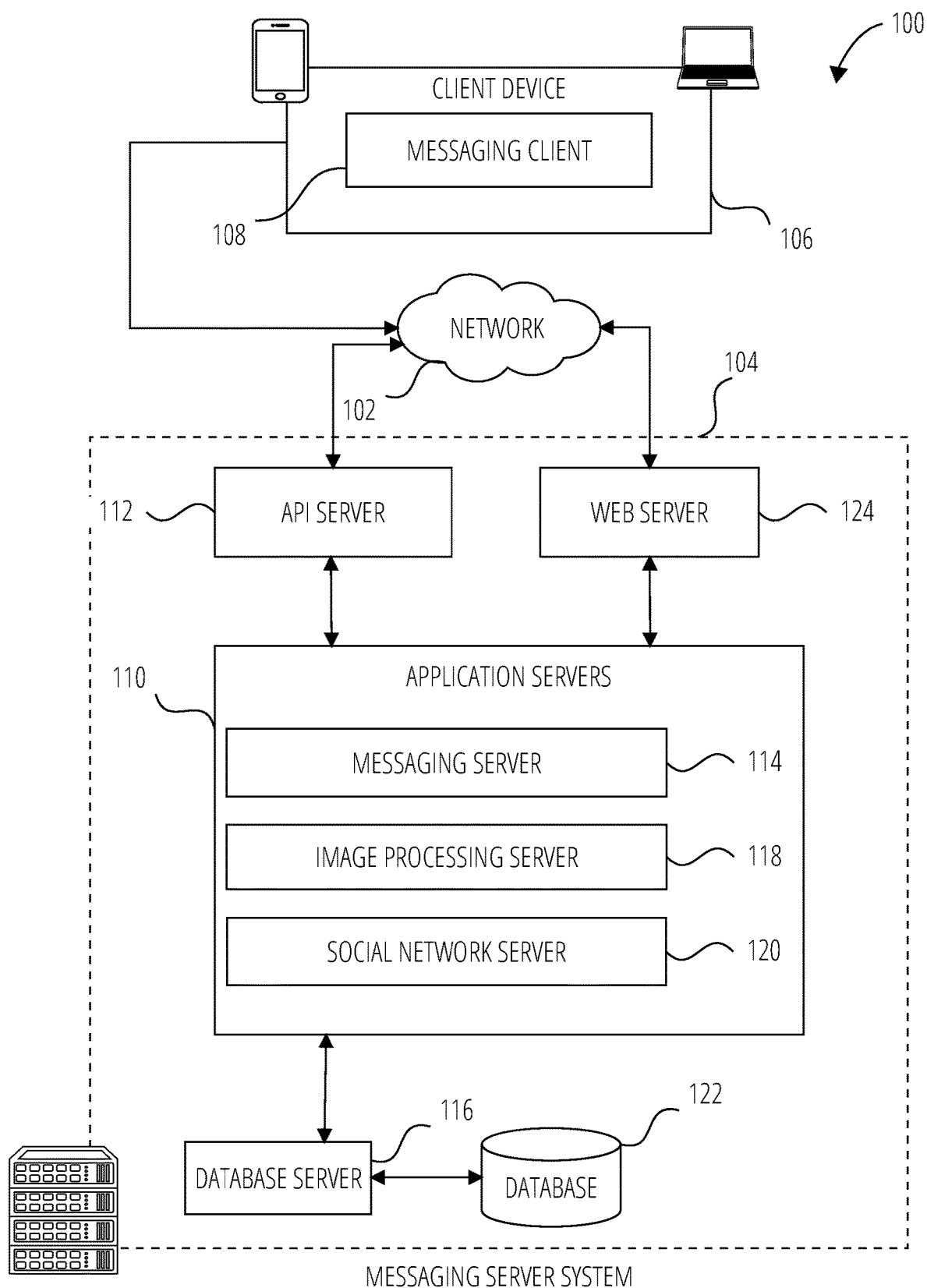
FIG. 1 is a diagrammatic representation of a networked environment in which the present disclosure may be deployed, in accordance with some examples.

The disclosed system provides systems and methods for minting NFT based on a media object that comprises an Augmented-Reality (AR) filter, and for providing "one-of-a-kind" to "open-edition" NFT dynamics. According to certain example embodiments, an NFT system may perform operations that include: minting an NFT that comprises a media object and mutable metadata, wherein the NFT comprises a "one-of-a-kind" NFT; allocating the NFT to a user of a client device; granting the user of the client device a permission to change the mutable metadata of the NFT based on the allocating the NFT to the user of the client device; generating an open-edition of the NFT, the open-edition of the NFT comprising a reference to the mutable metadata; receiving a change to the mutable metadata from the user of the client device; and updating the open-edition of the NFT based on the change.

According to certain example embodiments, an NFT may refer to a representation of a digital asset, such as an image, gif, in-game item, or Augmented Reality (AR) data object, such as a media filter, whose provenance can be uniquely authenticated via a blockchain, such as the Ethereum Blockchain. Accordingly, an NFT may refer to a digital asset in which a secure record of ownership is stored via a blockchain. In certain embodiments, an NFT may include a "one-of-a-kind" NFT, as well as an "open-edition" NFT, wherein a one-of-a-kind NFT refers to a single edition NFT with no intention of replication, and an open edition NFT refers to an NFT that has no limit to how many times it can be minted.

According to certain example embodiments, a one-of-a-kind NFT may be generated through the process of "minting." Minting an NFT token may therefore refer to a method of adding a unique record associated with the NFT on a blockchain, wherein the unique record points to the location of the asset (i.e., the NFT) on a network, such as the internet. Accordingly, a one-of-a-kind NFT may comprise a token and a data object, such as an AR filter, wherein the token acts as a certificate of authenticity.

In some embodiments, the one-of-a-kind NFT may be minted through a smart contract that assigns ownership and manages the transferability and dynamics of the one-of-a-kind NFT. For example, when someone creates or mints and NFT, they execute code stored in smart contracts that conform to an NFT-standard, wherein the NFT-standard provides basic functionality to track and transfer the NFT. This information may be added to the blockchain where the NFT is being managed. Accordingly, the minting process may comprise steps for: creating a new block; validating information; and recording information into the blockchain.

In some embodiments, a one-of-a-kind NFT may comprise a smart contract that defines specialized one-of-a-kind to open-edition dynamics. As discussed above, a one-of-a-kind NFT may comprise mutable (or editable) metadata writable only by a current owner of the one-of-a-kind NFT, and wherein changes made by an owner to the mutable metadata may effect all open-editions of the NFT. The features of an NFT that are editable may be defined by a creator of the data object of the NFT (e.g., an AR filter). Features that may be editable based on the mutable metadata may for example include graphical properties of the data object, as well as textual elements that may be included within the data object.

Changes made to the mutable metadata of the one-of-a-kind NFT may be stored within a decentralized database in perpetuity. The changes stored within the decentralized database may include a timestamp of when the change was made, a tokenized identifier associated with the data object, and the type of change that was made to the data object. Accordingly, an open-edition of the NFT may comprise a reference to the changes stored within the decentralized database, such that changes made to the mutable metadata are applied to all open-editions of a given one-of-a-kind NFT.

In certain example embodiments, the NFT may be generated based on a data object, wherein the data object comprises an AR filter (i.e., a lens), and wherein the AR filter provides an interactive experience of a real-world environment where the object that reside within the real world are enhanced by computer-generated perceptual information, sometimes across multiple sensor modalities. Accordingly, in such embodiments, the NFT system may access a data object (i.e., an AR filter) based on an input received from a client device, and mint an NFT based on the data object and a blockchain. Minting the NFT based on the data object and blockchain may comprise operations that include: accessing the data object that comprises the AR filter; accessing a blockchain responsive to the accessing the data object; generating a hash value based on the data object that comprises the AR filter; generating a token that comprises a token name and a token symbol; generating the NFT based on the hash value, the token name, and the token symbol; and storing the NFT on the blockchain.

In some example embodiments, responsive to detecting a change in ownership of the NFT, the NFT system may re-allocate the special ownership rights from an initial owner of the NFT to a new owner of the NFT. Accordingly, an indication of the change in ownership may be recorded on the blockchain.

In some example embodiments, the NFT system may be configured to mint an "open-edition" of the NFT, responsive to receiving a request to access the NFT from a non-owner of the NFT. The open-edition of the NFT may provide a similar user experience to the one-of-a-kind of the NFT, but without the special ownership rights and access permissions granted by the one-of-a-kind edition of the NFT. Accordingly, the NFT system may restrict minting of open-editions of the NFT to a minting period, wherein the minting period may initiate upon detecting a change in ownership of the NFT. In some embodiments, the minting period may be defined by one or more of a period of time, and a maximum number of open-editions of the NFT.

Consider an illustrative example from a user perspective. A media creator may provide a data object to the NFT system, wherein the data object may include a media object such as an AR filter (i.e., lens). Responsive to receiving the data object, the NFT system generates a one-of-a-kind NFT, wherein the one-of-a-kind NFT comprises mutable metadata, and a "smart contract" to provide one or more special permissions and features associated with the data object of the NFT to an owner of the one-of-a-kind NFT. For example, the smart contract may provide that an owner of the NFT is granted privileges to edit or change mutable metadata associated with the one-of-a-kind NFT, such that any changes made by the owner of the one-of-a-kind NFT may be applied to any "open-edition" NFT associated with the one-of-a-kind NFT.

A first user may acquire the one-of-a-kind NFT generated by the NFT system, such as through an NFT marketplace, and in response, the NFT system may allocate the special permissions associated with the one-of-a-kind NFT to the first user. The first user may thereby be presented with a specially configured interface that comprises a menu element to edit or change the mutable metadata of the one-of-a-kind NFT. For example, the menu element may enable the user to change or add one or more graphical attributes of the data object of the one-of-a-kind NFT, or change text associated with the data object of the one-of-a-kind NFT.

A user may provide a request to mint an "open-edition" of the NFT within a period of time after the one-of-a-kind NFT is allocated to the first user. For example, in some embodiments, the NFT system may enable open-edition NFT to be minted for a period of time after a change of ownership of the corresponding one-of-a-kind NFT.

The one-of-a-kind NFT may later change ownership from the first user to a second user, via a sale of the one-of-the-kind NFT through an NFT marketplace. Upon changing ownership, the NFT system may record the change of ownership on a blockchain, along with a timestamp. The second user may thereby provide a change to the mutable metadata of the one-of-a-kind NFT, and in response, the NFT system may store the change within a decentralized database, and apply the change to any corresponding open-edition NFT.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
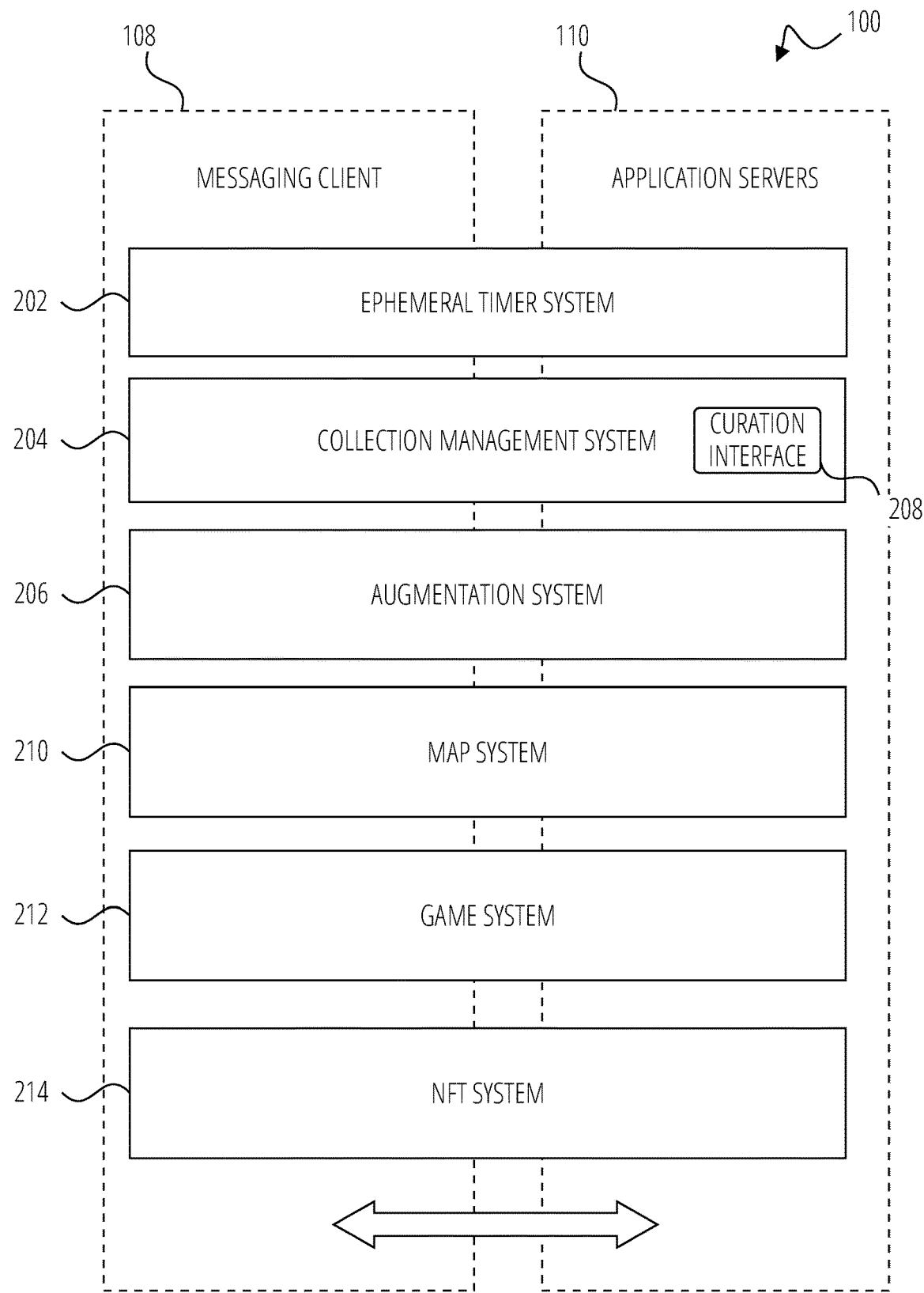
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and an NFT system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 316 (deleted)) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The NFT system 214 provides functions related to minting "one-of-a-kind" and "open-edition" NFT based on data objects provided to the system, wherein the data objects may include AR filters according to certain example embodiments.

Figure 3:
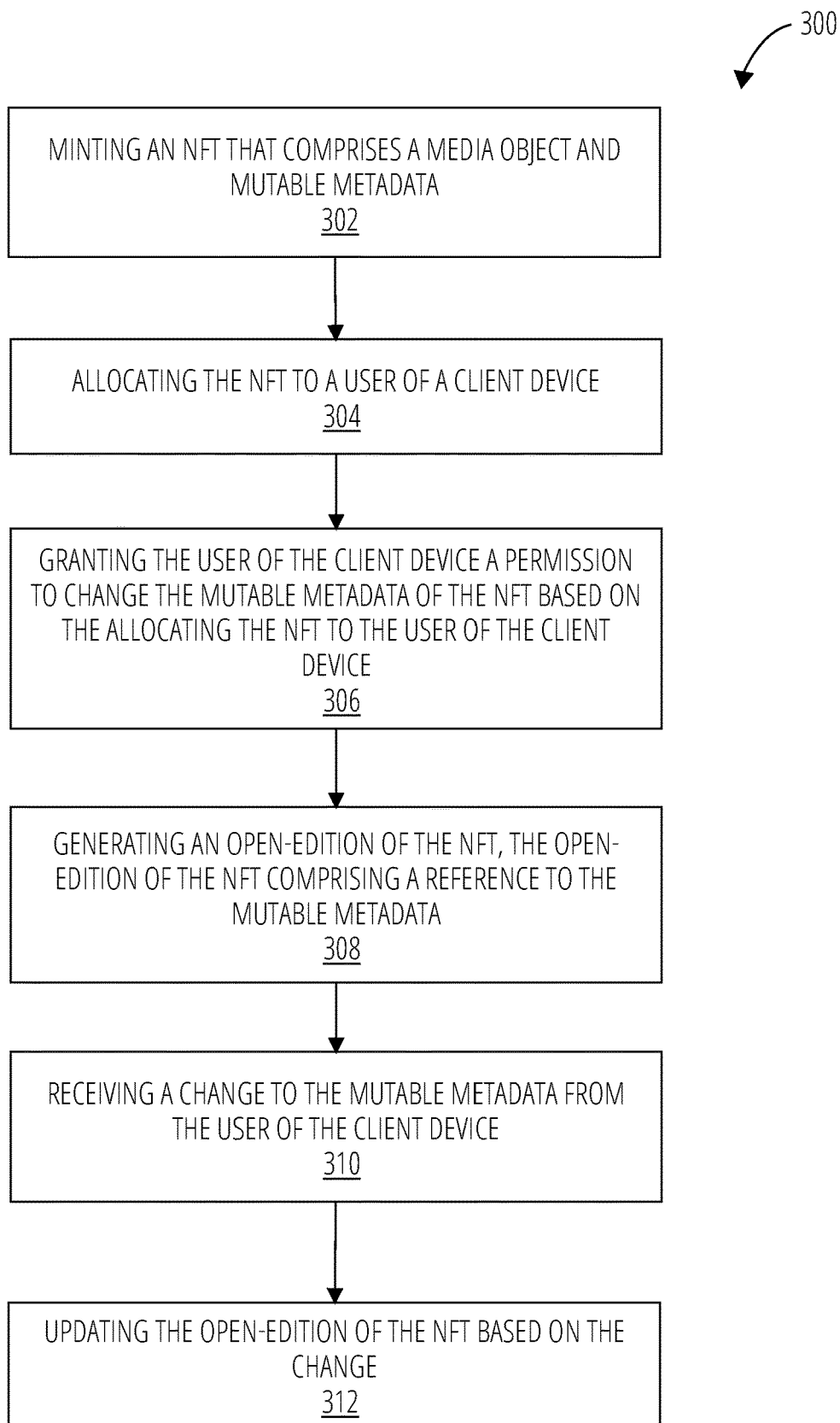
FIG. 3 is a flowchart depicting a method 300 for providing one-of-a-kind NFT to open-edition dynamics, in accordance with one embodiment.

FIG. 3 is a flowchart illustrating operations of an NFT system 214 in performing a method 300 for providing one-of-a-kind NFT to open-edition dynamics, according to certain example embodiments. Operations of the method 300 may be performed by one or more subsystems of the messaging system 100 described above with respect to FIG. 2, such as the NFT system 214. As shown in FIG. 3, the method 300 includes one or more operations, 302, 304, 306, 308, 310 and 312.

At operation 302, the NFT system 214 mints a one-of-a-kind NFT that comprises a media object and mutable metadata. For example, the media object may comprise an AR filter that comprises a set of features that may be modified based on changes made to the mutable metadata of the one-of-a-kind NFT.

At operation 304, the NFT system 214 allocates the one-of-a-kind NFT to a user of a client device 106, wherein the user of the client device 106 is identified as an owner of the one-of-a-kind NFT. For example, the user of the client device 106 may acquire the one-of-a-kind NFT through an NFT marketplace.

At operation 306, responsive to allocating the one-of-a-kind NFT to the user of the client device 106, the NFT system 214 grants the user of the client device 106 a permission to change the mutable metadata of the one-of-a-kind NFT. For example, in some embodiments the NFT system 214 may cause display of a graphical user interface (GUI) at the client device 106, wherein the GUI comprises a display of a menu element to make changes to the mutable metadata in order to configure a set of features of an AR filter.

At operation 308, responsive to a request, the NFT system 214 generates an open-edition of the NFT, wherein the open-edition of the NFT comprises a reference to the mutable metadata of the one-of-a-kind NFT.

At operation 310, the NFT system 214 receives a change to the mutable metadata of the one-of-a-kind NFT via the GUI presented at the client device 106. Responsive to receiving the change to the mutable metadata of the one-of-a-kind NFT, the NFT system 214 stores a record of the change within a decentralized database, such as the database 122.

For example, in some embodiments, when an owner of the one-of-a-kind NFT navigates to a display of the one-of-a-kind NFT, such as at their corresponding crypto-wallet, the owner may be presented with a specialized admin panel to make changes to the mutable metadata associated with the one-of-a-kind NFT. Changes made to the mutable metadata are stored within a decentralized database, such as the database 122 along with a timestamp of when the change was made, a tokenized identifier of the data object of the one-of-a-kind NFT, and an indication of the type of change that was made.

At operation 312, the NFT system 214 updates the open-edition of the NFT based on the change made to the mutable metadata of the one-of-a-kind NFT, based on the record of the change stored within the decentralized database.

Figure 4:
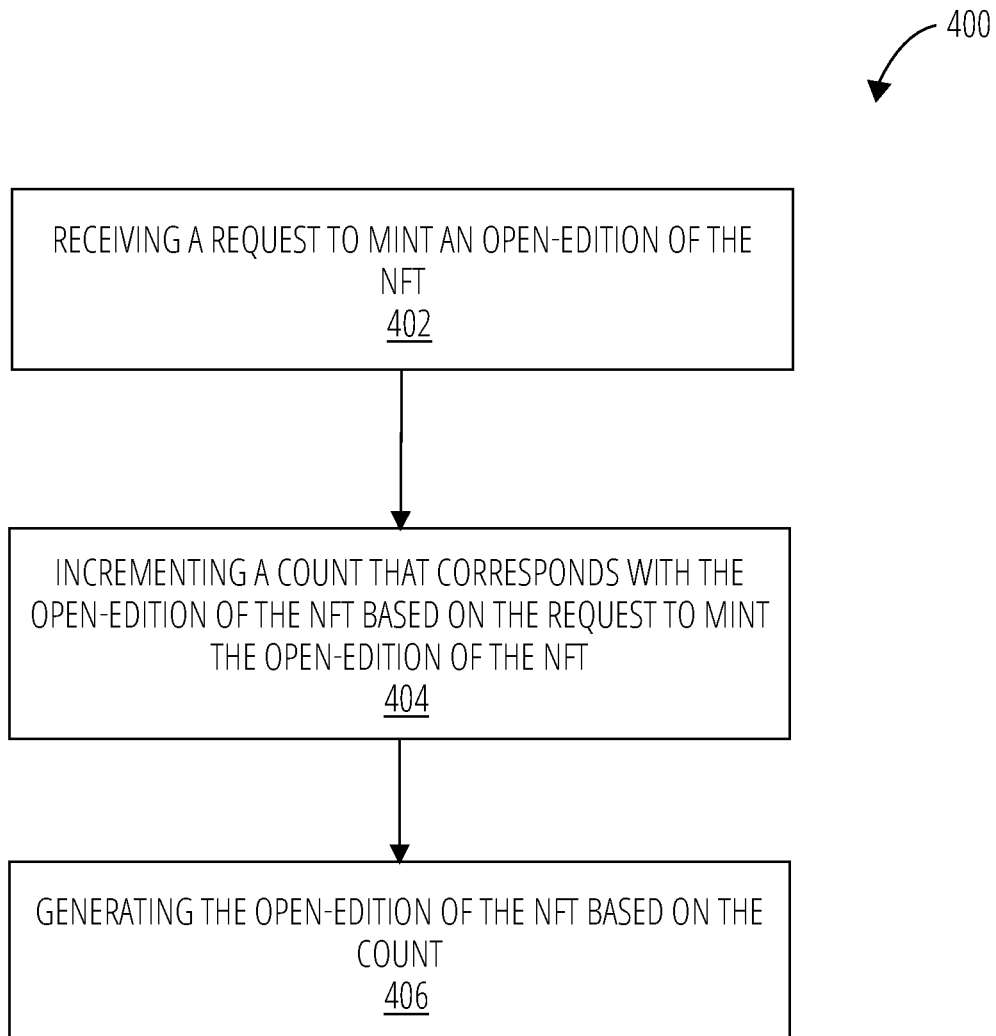
FIG. 4 is a flowchart depicting a method 400 for providing one-of-a-kind NFT to open-edition dynamics, in accordance with one embodiment.

FIG. 4 is a flowchart illustrating operations of an NFT system 214 in performing a method 400 for providing one-of-a-kind NFT to open-edition dynamics, according to certain example embodiments. Operations of the method 400 may be performed by one or more subsystems of the messaging system 100 described above with respect to FIG. 2, such as the NFT system 214. As shown in FIG. 4, the method 400 includes one or more operations 402, 404, and 406 which may be performed as a subroutine of the method 300.

At operation 402, the NFT system 214 receives a request to mint an open-edition of a one-of-a-kind NFT, such as the NFT described in the method 300. Responsive to the request to mint the open-edition of the NFT, at operation 404, the NFT system 214 increments a count that corresponds with the open-edition. For example, the count may indicate a number of open-edition NFT minted since the creation of a one-of-a-kind NFT.

At operation 406, the NFT system 214 mints the open-edition of the one-of-a-kind NFT based on the count. For example, in some embodiments the NFT system 214 may be configured to limit a maximum number of open-edition NFT that may be minted. In some embodiments, the NFT system 214 may provide that an unlimited number of open-edition NFT may be minted for a period of time after a change in ownership of the corresponding one-of-a-kind NFT. In some embodiments, the open-edition of the NFT may comprise a display of the corresponding count number.

Figure 5:
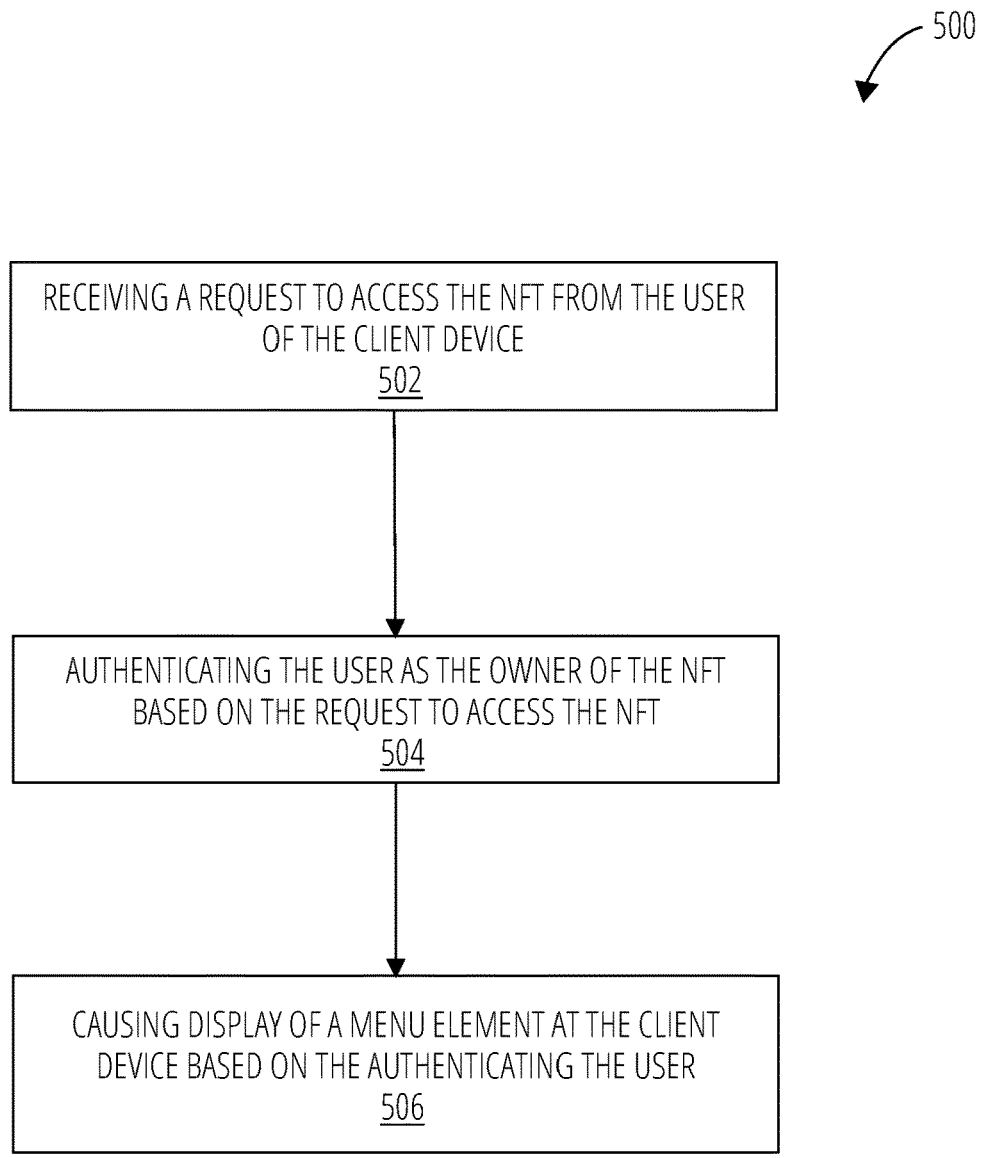
FIG. 5 is a flowchart depicting a method 500 for providing one-of-a-kind NFT to open-edition dynamics, in accordance with one embodiment.

FIG. 5 is a flowchart illustrating operations of an NFT system 214 in performing a method 500 for providing one-of-a-kind NFT to open-edition dynamics, according to certain example embodiments. Operations of the method 500 may be performed by one or more subsystems of the messaging system 100 described above with respect to FIG. 2, such as the NFT system 214. As shown in FIG. 5, the method 500 includes one or more operations 502, 504, and 506, that may be performed as a subroutine of the method 300.

As discussed above, according to certain example embodiments, a one-of-a-kind NFT generated by the NFT system 214 may be configured to confer special privileges to an owner of the one-of-a-kind NFT, such as providing the owner of the NFT with special privileges to edit or change mutable metadata associated with a one-of-a-kind NFT, and storing a record of the change to the mutable metadata of the one-of-a-kind NFT within a decentralized database, and wherein an open-edition NFT associated with the one-of-a-kind NFT may reference the record within the decentralized database. Accordingly, upon determining that a change in ownership of the one-of-a-kind NFT has occurred, the NFT system 214 may store a record of the ownership change on a blockchain.

At operation 502 of the method 500, the NFT system 214 may receive a request to access the one-of-a-kind NFT from a user of a client device 106. Responsive to receiving the request to access the one-of-a-kind NFT, the NFT system 214 accesses the blockchain and, at operation 504, authenticates the user of the client device 106 based on the record of ownership on the blockchain.

At operation 506, responsive to authenticating the user of the client device 106, the NFT system 214 causes display of a menu element at the client device 106, wherein the menu element is configured to receive changes to a mutable metadata associated with the one-of-a-kind NFT.

Figure 6:
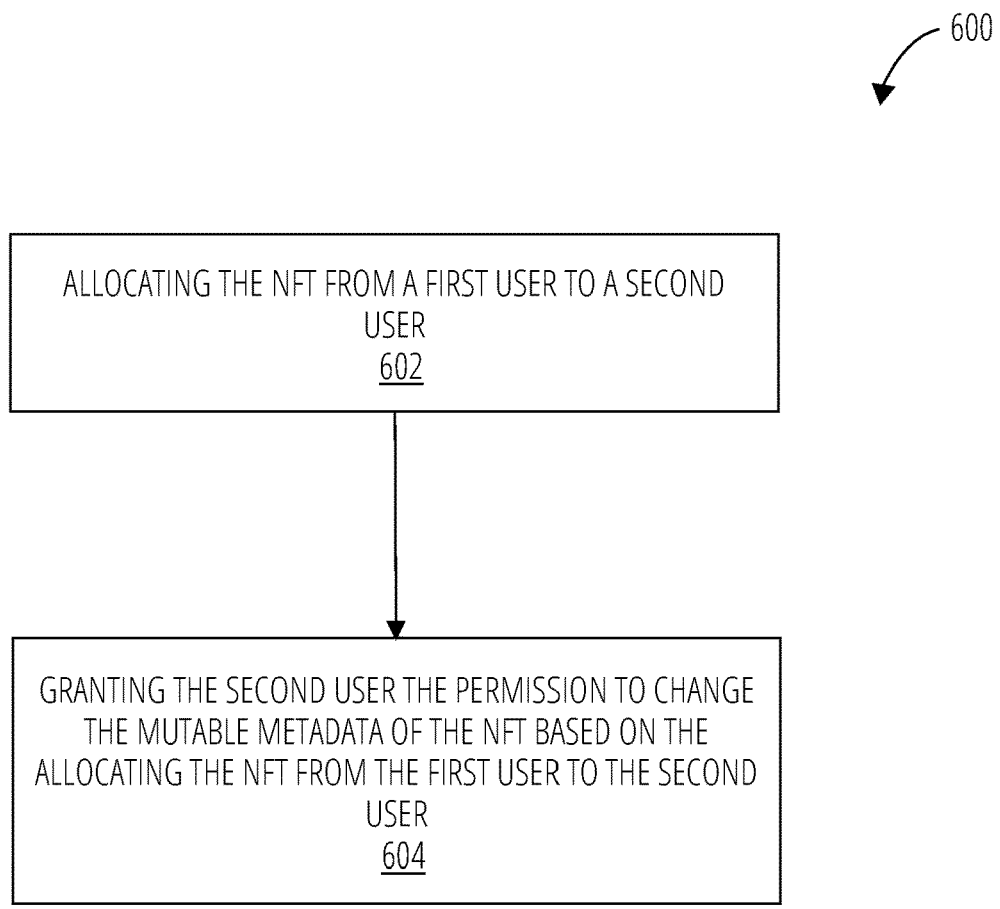
FIG. 6 is a flowchart depicting a method 600 for providing one-of-a-kind NFT to open-edition dynamics, in accordance with one embodiment.

FIG. 6 is a flowchart illustrating operations of an NFT system 214 in performing a method 600 for providing one-of-a-kind NFT to open-edition dynamics, according to certain example embodiments. Operations of the method 600 may be performed by one or more subsystems of the messaging system 100 described above with respect to FIG. 2, such as the NFT system 214. As shown in FIG. 6, the method 600 includes one or more operations 602, and 604 that may be performed as a subroutine of the method 300.

As discussed above, according to certain example embodiments, a one-of-a-kind NFT generated by the NFT system 214 may be configured to confer special privileges to an owner of the one-of-a-kind NFT, such as providing the owner of the NFT with special privileges to edit or change mutable metadata associated with a one-of-a-kind NFT.

At operation 602, the NFT system 214 allocates (or re-allocates) the one-of-a-kind NFT from a first user to a second user. For example, the second user may acquire the one-of-a-kind NFT from the first user over an NFT marketplace.

At operation 604, the NFT system 214 grants the second user the special permissions associated with the one-of-a-kind NFT based on the allocating the one-of-a-kind NFT from the first user to the second user. As discussed above, the special permissions associated with the one-of-a-kind NFT may include a permission to edit or change mutable metadata associated with the one-of-a-kind NFT, and wherein one or more open-edition NFT associated with the on-of-a-kind NFT may comprise a reference to the mutable metadata.

Figure 7:
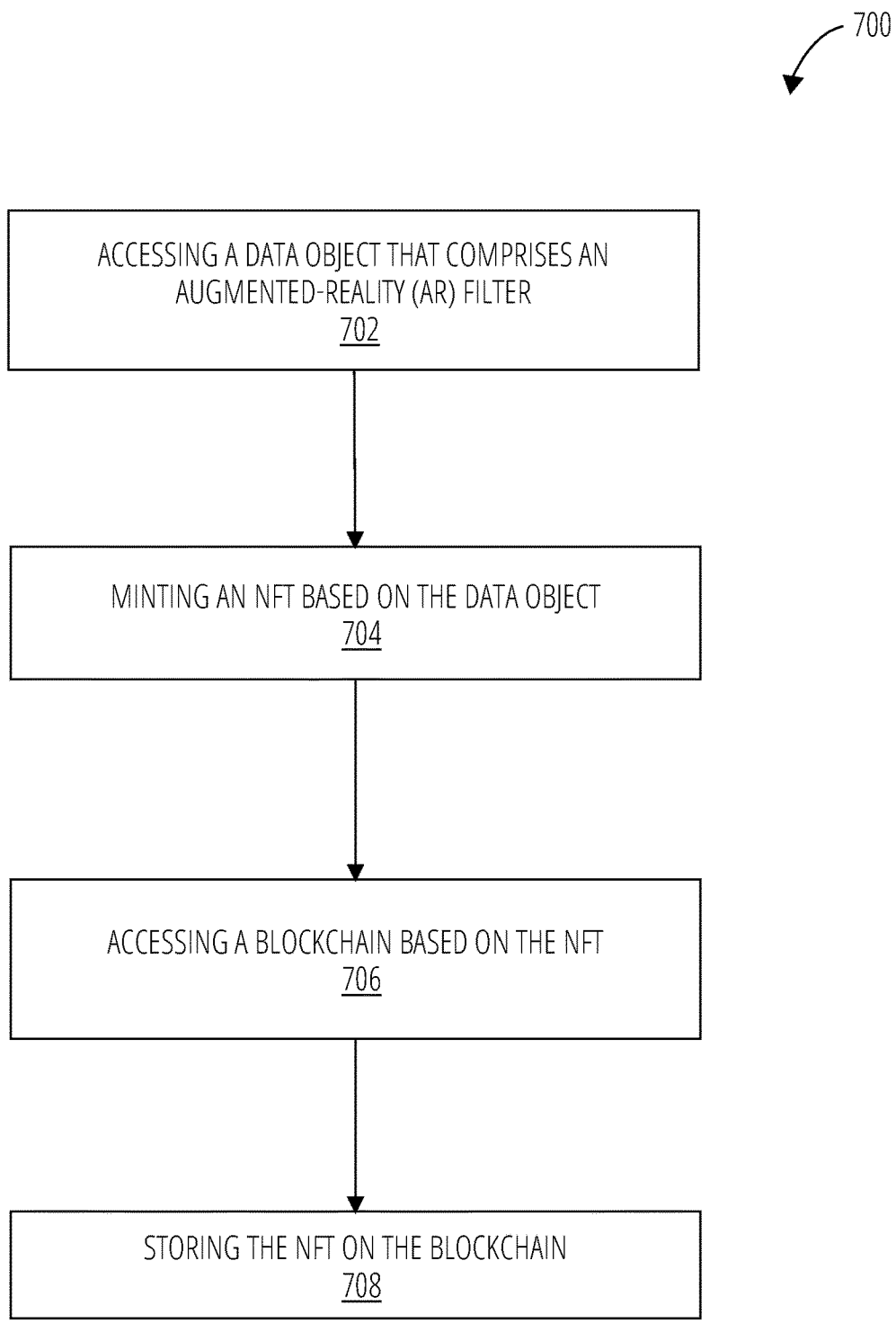
FIG. 7 is a flowchart depicting a method 700 for minting an NFT based on a data object that comprises an Augmented-Reality (AR) filter, in accordance with one embodiment.

FIG. 7 is a flowchart illustrating operations of an NFT system 214 in performing a method 700 for minting an NFT based on a data object that comprises an AR filter, according to certain example embodiments. Operations of the method 700 may be performed by one or more subsystems of the messaging system 100 described above with respect to FIG. 2, such as the NFT system 214. As shown in FIG. 7, the method 700 includes one or more operations 702, 704, 706, and 708 that may be performed as a subroutine of the method 300.

At operation 702, responsive to receiving a request, the NFT system 214 accesses the data object that comprises the AR filter. According to certain example embodiments, the NFT system 214 may be configured to receive, over a distributed computing network (i.e., the network 102) m a request to mint a one-of-a-kind NFT, wherein the NFT comprises a unique NFT identifier, at least one metadata element, wherein the metadata element may comprise a mutable metadata element, and a data object, wherein the data object may comprise an AR filter.

At operation 704, the NFT system 214 mints a one-of-a-kind NFT based on the data object, and at operation 706, the NFT system 214 accesses a blockchain to record the NFT identifier of the one-of-a-kind NFT at operation 708. For example, in certain embodiments a blockchain proxy server may be operatively connected to the NFT system 214 and to a distributed blockchain ledger. Recording the NFT identifier may comprise operations for recording the NFT identifier of the one-of-a-kind NFT on a new transaction block with the distributed blockchain ledger of the blockchain.

Figure 8:
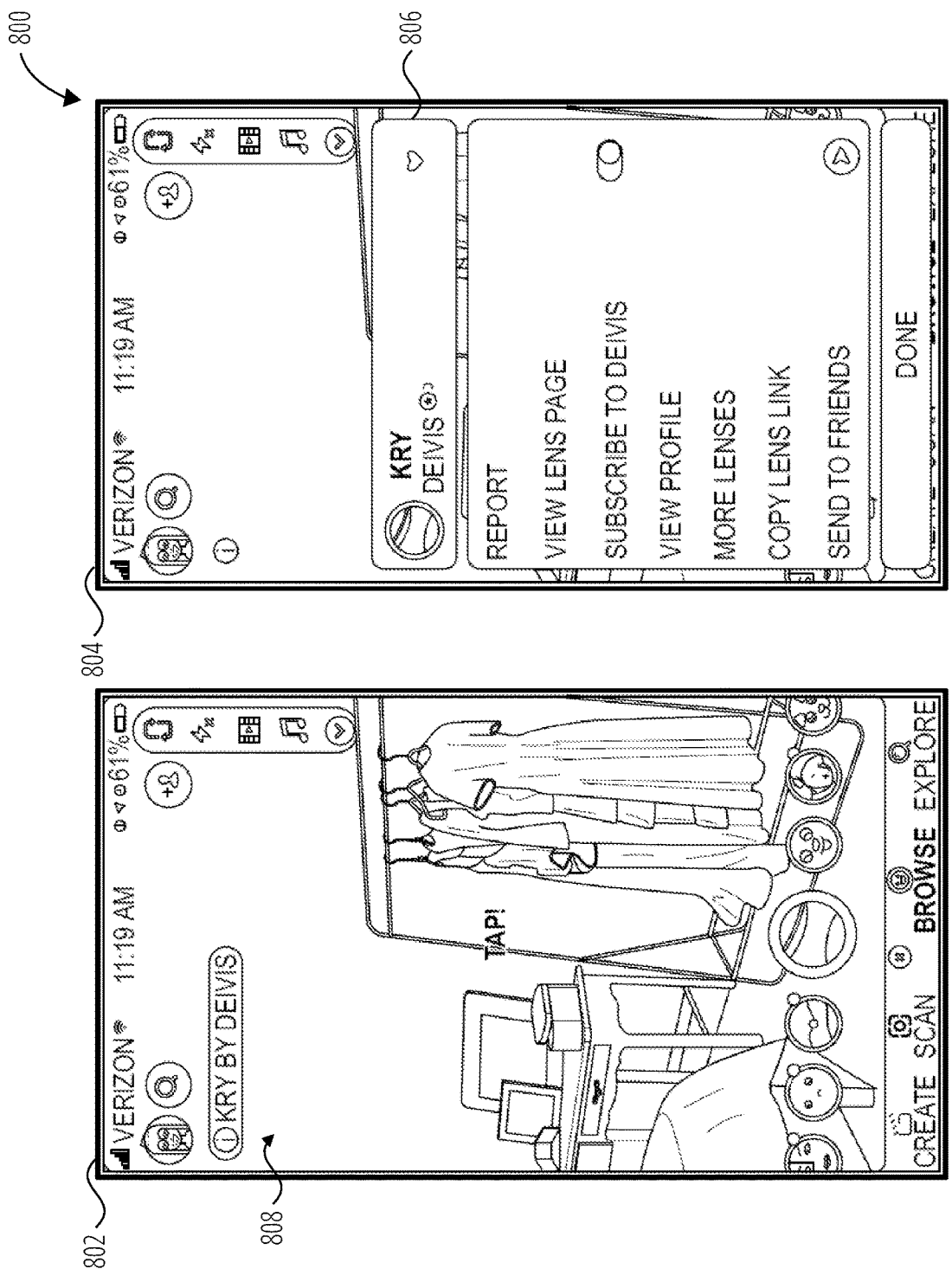
FIG. 8 is an interface diagram depicting an interface to display NFT, in accordance with one embodiment.

FIG. 8 is an interface diagram 800 depicting various interfaces presented by the NFT system 214, according to certain example embodiments. As seen in FIG. 8, the interface diagram 800 includes interfaces 802 and 804.

According to certain embodiments, and as discussed in the method 300 depicted in FIG. 3, a user of a client device 106 may be presented with a specialized admin panel 806 to make changes to the mutable metadata associated with a one-of-a-kind NFT. As seen in FIG. 8, a user may display an NFT 808, wherein the NFT comprises an AR filter (i.e., lens). Upon validating that the user is an owner of the NFT 808, the NFT system 214 may cause display of an admin panel 806, wherein the admin panel 806 provides one or more menu elements to make changes to mutable metadata associated with the NFT 808.

As discussed above, changes made to the mutable metadata via the admin panel 806 are stored within a decentralized database, such as the database 122 along with a timestamp of when the change was made, a tokenized identifier of the data object of the one-of-a-kind NFT, and an indication of the type of change that was made. Open-edition NFT associated with the NFT 808 may then be updated based on the changes.

Figure 9:
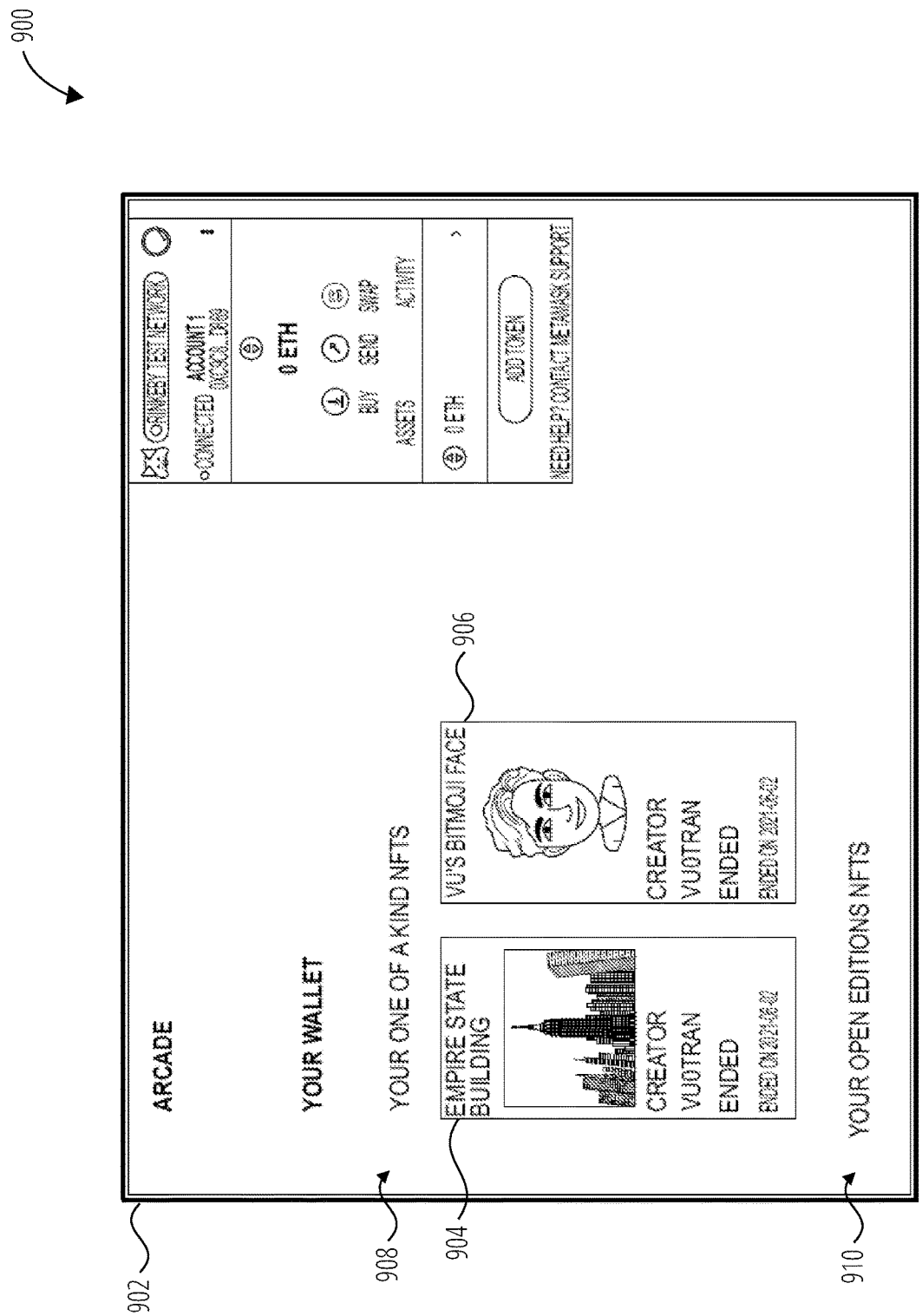
FIG. 9 is an interface diagram depicting an interface to display NFT, in accordance with one embodiment.

FIG. 9 is an interface diagram 900 depicting a GUI 902 to display NFT associated with a user profile, according to certain example embodiments. As seen in the interface diagram 900, a user may cause display of the GUI 902 to display one or more NFT associated with a user account at a client device 106, such as the NFT 904 and the NFT 906. For example, the GUI may display NFT created by the user, and NFT acquired by the user, for example through an NFT marketplace.

As seen in the interface diagram 900, the GUI may comprise a first region 908 to display one-of-a-kind NFT, such as the NFT 904 and the NFT 906, and a second region to display open-edition NFT that may be associated with the user account. In some embodiments, a user of the client device 106 may access an admin panel associated with a one-of-a-kind NFT to change or edit mutable metadata associated with the one-of-a-kind NFT, by providing an input that selects a display of the one-of-a-kind NFT.

In some embodiments, a presentation of NFT within the GUI 902 may include a display of attributes associated with the NFT, such as an identification of a creator of the NFT, a date that the NFT was created, as well as a title or identifier associated with the NFT.

Figure 10:
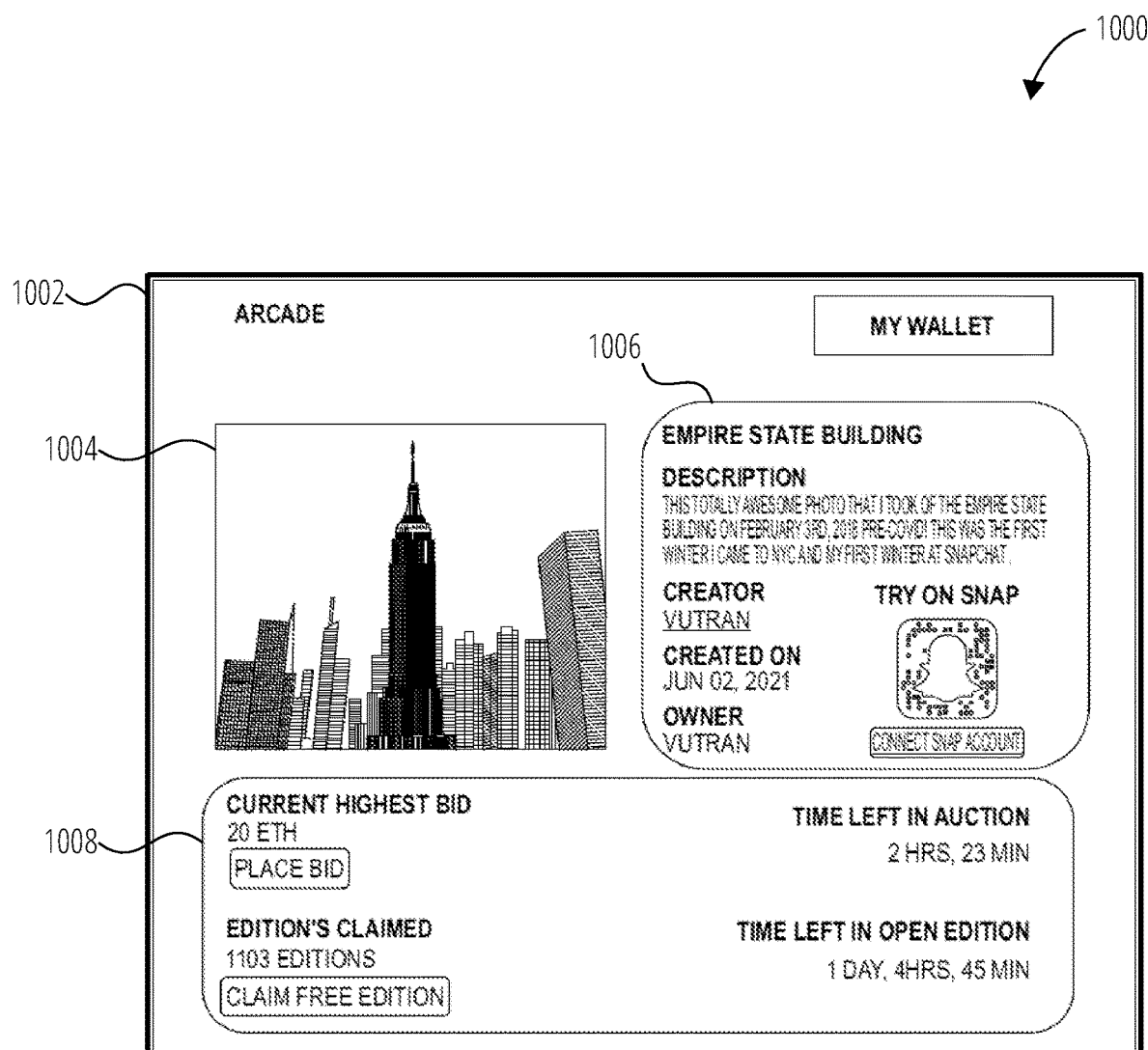
FIG. 10 illustrates an aspect of the subject matter in accordance with one embodiment.

In some embodiments, a user may provide an input to select the NFT 904 from within the GUI 902, and in response, the NFT system 214 may generate and cause display of an interface to view details and attributes associated with the selected NFT, such as the GUI 1002 depicted in FIG. 10.

FIG. 10 is an interface diagram 1000 depicting a GUI 1002 to display NFT associated with a user profile, according to certain example embodiments. As seen in the interface diagram 1000, a user may cause display of the GUI 1002 to display attributes associated with a selected NFT, such as the NFT 1004. For example, the GUI 1002 may provide a display of attributes 1006 and 1008 associated with the NFT 1004 that may for example include a description, a bid amount, a number of open-editions associated with the NFT, as well as auction details associated with the NFT.

Machine Architecture

Figure 11:
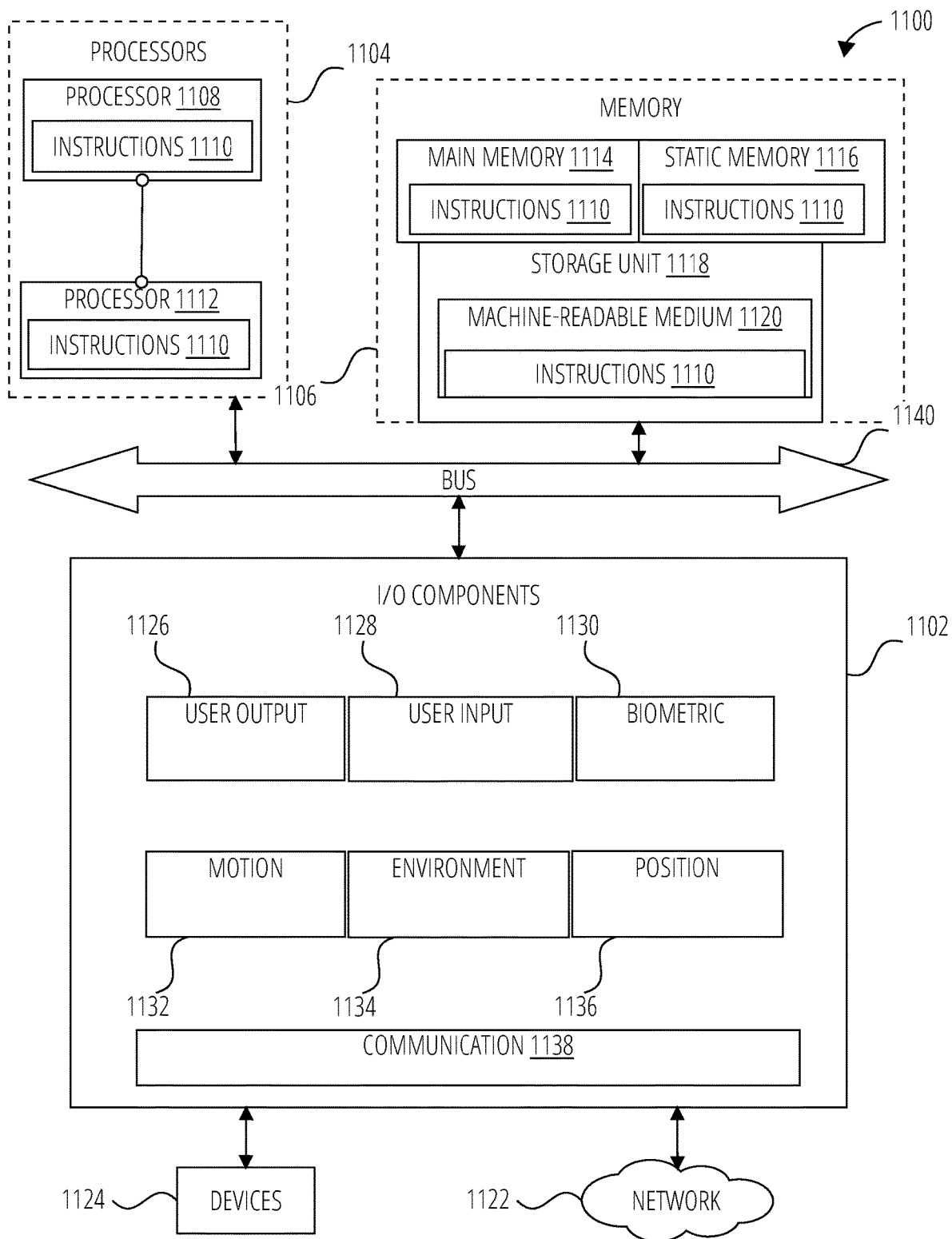
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein. The machine 1100, for example, may comprise the client device 106 or any one of a number of server devices forming part of the messaging server system 104. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 638, which may be configured to communicate with each other via a bus 1140. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within at least one of the processors 1104 (e.g., within the Processor's cache memory), or any suitable combination thereof, during execution thereof by the machine 1100.

The I/O components 1102 may include a wide variety of components to receive input, provide output, produce output, transmit information, exchange information, capture measurements, and so on. The specific I/O components 1102 that are included in a particular machine will depend on the type of machine. For example, portable machines such as mobile phones may include a touch input device or other such input mechanisms, while a headless server machine will likely not include such a touch input device. It will be appreciated that the I/O components 1102 may include many other components that are not shown in FIG. 11. In various examples, the I/O components 1102 may include user output components 1126 and user input components 1128. The user output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1132 include acceleration sensor components (e.g., accelerometer), gravitation sensor components, rotation sensor components (e.g., gyroscope).

The environmental components 1134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 1136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface Component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, location via detecting an NFC beacon signal that may indicate a particular location, and so forth.

The various memories (e.g., main memory 1114, static memory 1116, and memory of the processors 1104) and storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Software Architecture

Figure 12:
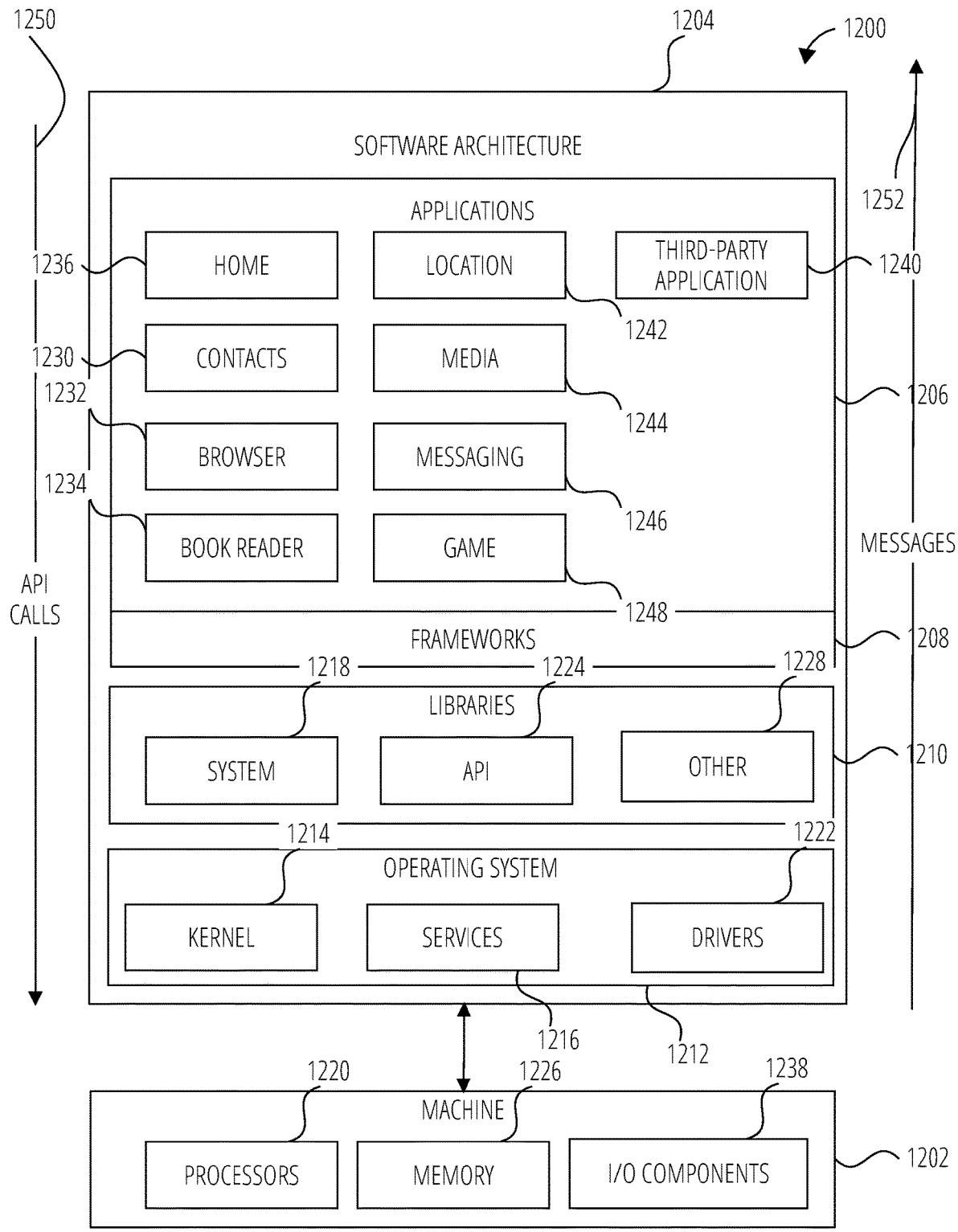
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Processing Components

Figure 13:
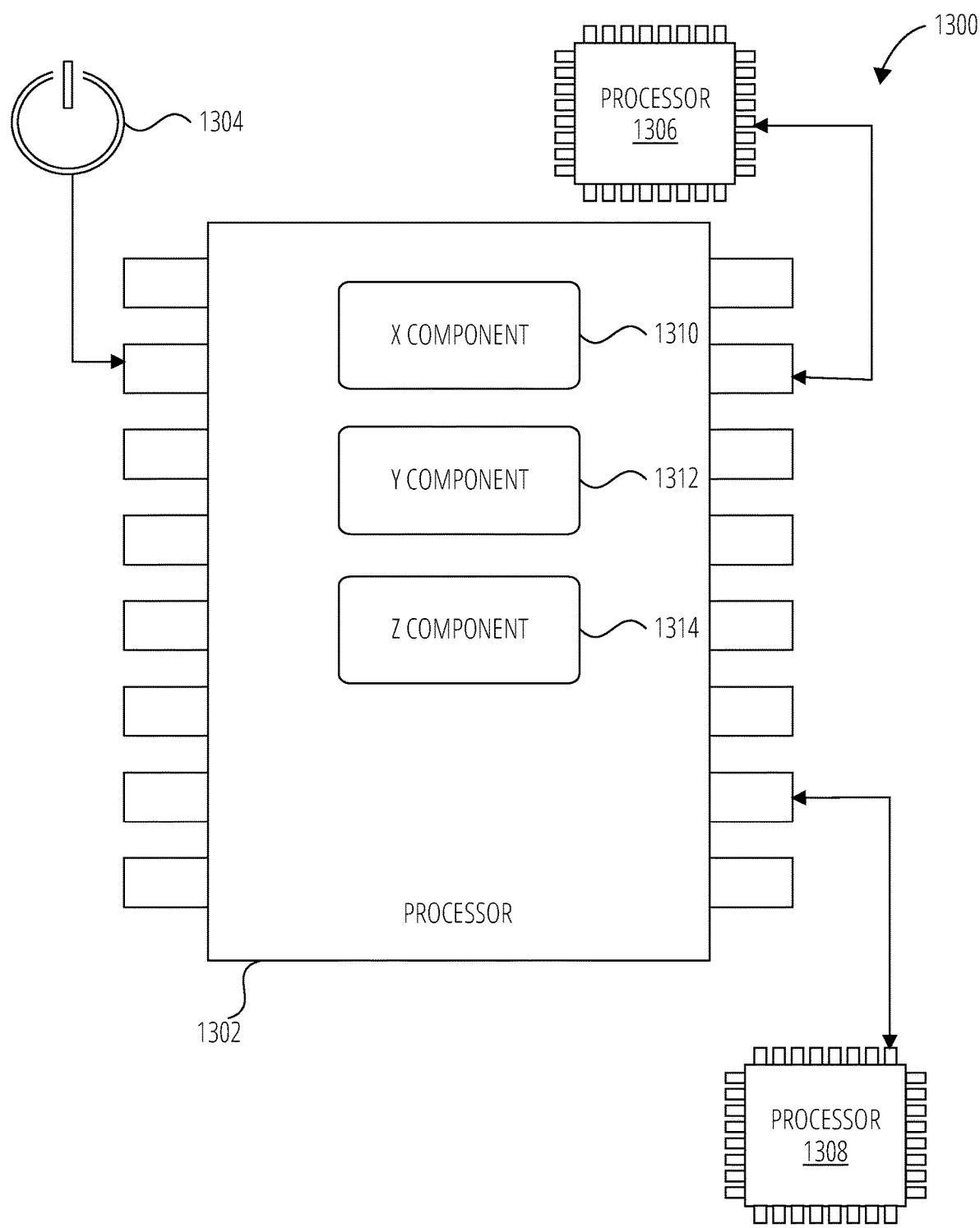
FIG. 13 is a diagrammatic representation of a processing environment, in accordance with some examples.

Turning now to FIG. 13, there is shown a diagrammatic representation of a processing environment 1300, which includes a processor 1302, a processor 1306, and a processor 1308 (e.g., a GPU, CPU or combination thereof).

The processor 1302 is shown to be coupled to a power source 1304, and to include (either permanently configured or temporarily instantiated) modules, namely an X component 1310, a Y component 1312, and a Z component 1314. The X component 1310 operationally receives requests to mint NFT based on media content that include AR filters, the Y component 1312 operationally manages one-of-a-kind to open-edition NFT dynamics, and the Z component 1314 operationally generates and presents GUI to display NFT. As illustrated, the processor 1302 is communicatively coupled to both the processor 1306 and the processor 1308.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   minting a Non-Fungible Token (NFT) that comprises a media object and mutable metadata that define graphical attributes of the NFT;
   allocating the NFT to a user of a client device;
   granting, for a predefined period of time initiated by the allocating the NFT to the user of the client device, the user of the client device a permission to change the mutable metadata of the NFT until an expiration of the predefined period of time responsive to the allocating the NFT to the user of the client device;
   generating an open-edition of the NFT, the open-edition of the NFT comprising a reference to the mutable metadata within a decentralized database;
   receiving, from the client device associated with the user, a change to the mutable metadata that defines the graphical attributes of the open edition of the NFT during the predefined period of time; and
   updating the graphical attributes of the open-edition of the NFT based on the change made to the mutable metadata stored within the decentralized database.

2. The method of claim 1, wherein the receiving the change to the mutable metadata further comprises:
   storing a record of the change to the mutable metadata within a decentralized database, the record comprising an attribute of the change, a timestamp, and an identifier of the media object.

3. The method of claim 2, wherein the reference to the mutable metadata comprises a reference to the record within the decentralized database.

4. The method of claim 1, wherein the method further comprises:
   receiving request to access the open-edition of the NFT;
   incrementing a count that corresponds with the open-edition of the NFT based on the request to access the open-edition of the NFT; and
   generating the open-edition of the NFT based on the count.

5. The method of claim 1, wherein the media object comprises an Augmented-Reality (AR) filter.

6. The method of claim 1, wherein the receiving the change to the mutable metadata further comprises:
   receiving a request to access the NFT from the user of the client device;
   authenticating the user based on the request to access the NFT; and
   causing display of a menu element to make changes to the mutable metadata of the NFT at the client device.

7. The method of claim 1, wherein the user is a first user of a first client device, and the method further comprises:
   allocating the NFT from the first user of the first client device to a second user of a second client device;
   granting the second user of the second client device the permission to change the mutable metadata of the NFT based on the allocating the NFT to the second user of the second client device.

8. A system comprising:
   a memory; and
   at least one hardware processor coupled to the memory and comprising instructions that causes the system to perform operations comprising:
   minting a Non-Fungible Token (NFT) that comprises a media object and mutable metadata that define graphical attributes of the NFT;
   allocating the NFT to a user of a client device;
   granting, for a predefined period of time initiated by the allocating the NFT to the user of the client device, the user of the client device a permission to change the mutable metadata of the NFT until an expiration of the predefined period of time responsive to the allocating the NFT to the user of the client device;
   generating an open-edition of the NFT, the open-edition of the NFT comprising a reference to the mutable metadata within a decentralized database;
   receiving, from the client device associated with the user, a change to the mutable metadata that defines the graphical attributes of the open edition of the NFT during the predefined period of time; and
   updating the graphical attributes of the open-edition of the NFT based on the change made to the mutable metadata stored within the decentralized database.

9. The system of claim 8, wherein the receiving the change to the mutable metadata further comprises:

storing a record of the change to the mutable metadata within a decentralized database, the record comprising an attribute of the change, a timestamp, and an identifier of the media object.

10. The system of claim 9, wherein the reference to the mutable metadata comprises a reference to the record within the decentralized database.

11. The system of claim 8, wherein the operations further comprise:
receiving request to access the open-edition of the NFT;
incrementing a count that corresponds with the open-edition of the NFT based on the request to access the open-edition of the NFT; and
generating the open-edition of the NFT based on the count.

12. The system of claim 8, wherein the media object comprises an Augmented-Reality (AR) filter.

13. The system of claim 8, wherein the receiving the change to the mutable metadata further comprises:
receiving a request to access the NFT from the user of the client device;
authenticating the user based on the request to access the NFT; and
causing display of a menu element to make changes to the mutable metadata of the NFT at the client device.

14. The system of claim 8, wherein the user is a first user of a first client device, and the operations further comprise:
allocating the NFT from the first user of the first client device to a second user of a second client device;
granting the second user of the second client device the permission to change the mutable metadata of the NFT based on the allocating the NFT to the second user of the second client device.

15. A non-transitory machine-readable storage medium comprising instructions that, when executed by one or more processors of a machine, cause the machine to perform operations including:
minting a Non-Fungible Token (NFT) that comprises a media object and mutable metadata that define graphical attributes of the NFT;
allocating the NFT to a user of a client device;
granting, for a predefined period of time initiated by the allocating the NFT to the user of the client device, the user of the client device a permission to change the mutable metadata of the NFT until an expiration of the predefined period of time responsive to the allocating the NFT to the user of the client device;
generating an open-edition of the NFT, the open-edition of the NFT comprising a reference to the mutable metadata within a decentralized database;
receiving, from the client device associated with the user, a change to the mutable metadata that defines the graphical attributes of the open edition of the NFT during the predefined period of time; and
updating the graphical attributes of the open-edition of the NFT based on the change made to the mutable metadata stored within the decentralized database.

16. The non-transitory machine-readable storage medium of claim 15, wherein the receiving the change to the mutable metadata further comprises:
storing a record of the change to the mutable metadata within a decentralized database, the record comprising an attribute of the change, a timestamp, and an identifier of the media object.

17. The non-transitory machine-readable storage medium of claim 16, wherein the reference to the mutable metadata comprises a reference to the record within the decentralized database.

18. The non-transitory machine-readable storage medium of claim 15, wherein the operations further comprise:
receiving request to access the open-edition of the NFT;
incrementing a count that corresponds with the open-edition of the NFT based on the request to access the open-edition of the NFT; and
generating the open-edition of the NFT based on the count.

19. The non-transitory machine-readable storage medium of claim 15, wherein the media object comprises an Augmented-Reality (AR) filter.

20. The non-transitory machine-readable storage medium of claim 15, wherein the receiving the change to the mutable metadata further comprises:
receiving a request to access the NFT from the user of the client device;
authenticating the user based on the request to access the NFT; and
causing display of a menu element to make changes to the mutable metadata of the NFT at the client device.

* * * * *